United States Patent [19]

Muller et al.

[11] 3,720,506

[45] March 13, 1973

[54] PROCESS FOR SEPARATING FERROPHOSPHORUS AND PHOSPHORUS FURNACE SLAG FROM ONE ANOTHER IN A CASTING BED

[75] Inventors: Fritz Muller, Knapsack near Cologne; Hugo Werner, Hermulheim near Cologne; Werner Nolden, Bruhl; Ursus Thummler, Hurth near Cologne, all of Germany

[73] Assignee: Knapsack Aktiengesellschaft, Knapsack bei Koln, Germany

[22] Filed: July 8, 1970

[21] Appl. No.: 53,095

[30] Foreign Application Priority Data

July 23, 1969 Germany............P 19 37 381.0

[52] U.S. Cl. .......................75/24, 23/293, 23/223, 75/30, 75/132
[51] Int. Cl. ...............................................C22b 7/04
[58] Field of Search............75/.5 BA, .5 AA, 24, 30; 164/70; 241/20; 299/16; 23/293, 223

[56] References Cited

UNITED STATES PATENTS

| | | | |
|---|---|---|---|
| 3,429,362 | 2/1969 | Tachimoto et al. | 164/70 |
| 2,250,213 | 7/1941 | Agnew | 75/24 |
| 3,298,822 | 1/1967 | Arvey et al. | 75/24 |
| 3,323,899 | 6/1967 | Forgeng et al. | 75/.5 BA |
| 3,357,817 | 12/1967 | Harnisch et al. | 75/.5 BA |
| 3,382,911 | 5/1968 | Malone | 164/70 |
| 3,565,603 | 2/1971 | Klee et al. | 75/24 |

FOREIGN PATENTS OR APPLICATIONS

| | | | |
|---|---|---|---|
| 632,240 | 7/1961 | Canada | 75/24 |
| 976,708 | 12/1964 | Great Britain | 75/30 |
| 1,170,852 | 5/1964 | Germany | 75/24 |
| 1,307,575 | 9/1962 | France | 75/24 |

Primary Examiner—Norman Yudkoff
Assistant Examiner—R. T. Foster
Attorney—Connolly and Hutz

[57] ABSTRACT

Process for separating ferrophosphorus and phosphorus furnace slag from one another in, and removing them from, a casting bed receiving a ferrophosphorus/phosphorus furnace slag-mixture. The mixture is poured into the casting bed, allowed to remain therein for a period of 2 to 2.5 hours and then cooled; after a period of between 4 and 5 hours after pouring, the phosphorus furnace slag is crushed from above by subjecting it to mechanical breaking stresses or impact stresses and the crushed slag is removed from the downstream end of the casting bed; and, after a period of between 5 and 6 hours after pouring, the ferrophosphorus is crushed away from above by subjecting it to mechanical impact stresses and the crushed ferrophosphorus is removed from below.

Apparatus for use in carrying out the process. The apparatus may be a digger provided with a telescopic arm which is arranged so as to be rotatable around its longitudinal axis and has interchangeable crushing means, slag removing means or ferrophosphorus removing means mounted on the head end of the said telescopic arm.

1 Claim, 4 Drawing Figures
}

PROCESS FOR SEPARATING FERROPHOSPHORUS AND PHOSPHORUS FURNACE SLAG FROM ONE ANOTHER IN A CASTING BED

The present invention relates to a process for separating ferrophosphorus and phosphorus furnace slag from one another in, and removing them from, a casting bed receiving a ferrophosphorus/phosphorus furnace slag mixture which is tapped off periodically from a phosphorus furnace, the heavier ferrophosphorus being deposited, separately from the phosphorus furnace slag which floats thereon, on the bottom of a sand casting bed; and to an apparatus for use in carrying out this process.

The ferrophosphorus/phosphorus furnace slag mixture which is tapped off periodically from furnaces for the electrothermal production of phosphorus from crude phosphates is normally delivered to a prepared sand bed and cooled therein until solid. During this operation, the heavier ferrophosphorus is found to settle, being sharply separated from phosphorus furnace slag floating thereon, on the bottom of the sand bed. The floating phosphorus furnace slag and the ferrophosphorus, which has to undergo further treatment, are normally removed from the casting bed by hand with the aid of pneumatic drills and hammers. In view of the excessively high initial temperature of the solidified material, it has been necessary heretofore to postpone this manual work for a minimum of 15 hours.

A further known process is carried out with the aid of a casting machine or a belt conveyor of the pig conveying type. If overfeeding of the belt conveyor ever occurs, however, this may make it necessary to seal the ferrophosphorus tapping hole prematurely so as to avoid the overflow of the material. This equipment, which includes extensive fume-exhausting means, is very expensive, requires considerable space and also entails very high operational costs.

It is an object of the present invention to provide a process for separating ferrophosphorus and phosphorus furnace slag from one another in, and removing them from, a casting bed, which is free from the disadvantages described above, and which enables rather difficult manual work to be omitted and the casting bed to be freed at a relatively early stage from material deposited therein. To this effect, the invention provides a process which comprises: pouring the cast metal into a casting bed, allowing the cast metal to remain therein for a period substantially within the range 2 to 2.5 hours and then cooling it; after a period substantially within the range 4 to 5 hours after pouring, crushing the phosphorus furnace slag from above by subjecting it to mechanical breaking stresses or impact stresses and removing the crushed slag from the downstream end of the casting bed; and, after a period substantially within the range 5 to 6 hours after pouring, crushing the ferrophosphorus from above by subjecting it to mechanical impact stresses and removing the crushed ferrophosphorus from below.

This process has been found to meet the requirements set forth hereinabove. More particularly, it enables manual work to be omitted, i.e., enables the casting bed to be freed at a relatively early stage from material present therein by means of mechanical equipment, and this despite the high temperatures prevailing.

Preferred features of the process of the present invention provide:

a. for the cast material to be cooled by spaying water thereonto;
b. for the crushed slag to be removed from the ferrophosphorus layer by means of a drag and/or backhoe implement;
c. for the ferrophosphorus layer to be cooled by spraying water thereonto, following removal of the crushed slag, and/or
d. for the ferrophosphorus layer to be water-sprayed so as merely to crack it, without affecting its position in the casting bed.

In accordance with the process of the present invention, a mixture of ferrophosphorus and phosphorus furnace slag may, for example, be poured into a prepared sand bed with the dimensions of 4 × 3 meters. The sand bed should most conveniently be placed at a level, with respect to the pivot(s) of the telescopic arm of a digger, which enables the shovel of the digger to be operated in a substantially horizontal direction with respect thereto. Once the sand bed has been filled with the sand mixture, and once the slag has a sufficiently solid surface, it is possible, within a period substantially within the range 2 to 2.5 hours after pouring, to start with the cooling of the bed by spraying water thereonto, through a plurality of pivotable nozzles. After a further period substantially within the range 2 to 2.5 hours, i.e., after altogether a period substantially within the range 4 to 5 hours from pouring, it is possible to free the casting bed from the material deposited therein.

The present invention also includes an apparatus for use in carrying out the above process, the apparatus comprising a digger provided with a telescopic arm which is arranged so as to be rotatable around its longitudinal axis and has interchangeable crushing means, slag removing means or ferrophosphorus removing means mounted on the head end of the said telescopic arm.

Preferred features of the apparatus of the present invention provide:

a. for the arm to be fitted with a backhoe implement having a drag secured to its rear side for crushing the slag layer and removing it;
b. for the arm to be fitted with a fork-shaped shovel (cf. FIGS. 1 and 2 of the accompanying drawings) for the removal of relatively coarse ferrophosphorus;
c. for the arm to be fitted with a shovel taking the form of a screening box (cf. FIGS. 3 and 4 of the accompanying drawings) for the removal of relatively fine ferrophosphorus, and/or
d. for the bottom, the rear wall and the side walls of the screening box to be made of perforated sheet iron, expanded metal or wide-meshed wire gauze with meshes 15 to 30 mm across.

The process of the present invention is preferably carried out with the use of a digger provided with a telescopic arm. The step of crushing the slag layer, having a thickness of (e.g.,) between 20 and 40 centimeters, breaks the bond between the layers of slag and ferrophosphorus. Following this step, the slag layer can be removed by means of a drag and/or backhoe implement. More preferably, this is done with the use of a tool which is a combination of a drag and backhoe implement. The slag may either be deposited beside the casting bed or be delivered by means of the digger to a container, if desired after the implement or tool mounted on the digger arm has been exchanged.

The invention also provides for a hydraulically or pneumatically operated hammer to be mounted on the digger to knock off slag which may be found, according to the particular conditions selected in a given case for the operation of the furnace, to adhere very tenaciously to the ferrophosphorus.

Once the layer of slag has been removed, the uncovered ferrophosphorus can be water-cooled with the use of a plurality of spray nozzles, if necessary or convenient. The drag forming part of the combined tool described hereinabove can be used to break up the ferrophosphorus layer, having a thickness of between 10 and 30 centimeters, for example, into fragments of desirable size. This operation is preferably carried out in such a manner that the ferrophosphorus layer is merely cracked, its position in the casting bed being substantially not affected.

An embodiment of the apparatus of the present invention is shown diagrammatically in the accompanying drawings. Needless to say, the invention is in no way limited to the embodiment illustrated. In the drawings.

Figure 2:
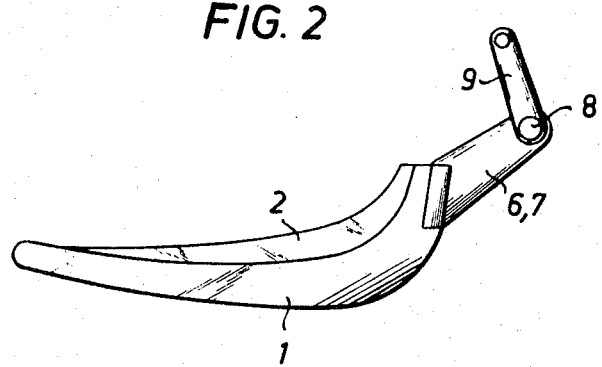
FIG. 2 is a sectional view taken along the line II—II of FIG. 1.
Figure 1:
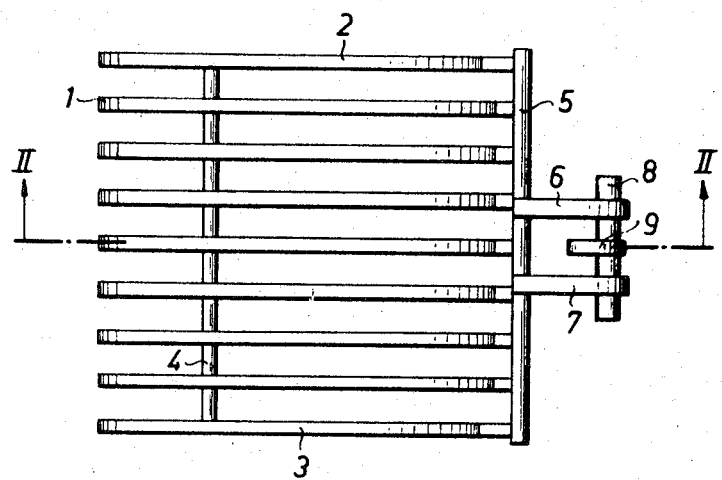
FIG. 1 is a top plan view of a fork-shaped shovel forming part of a digger.

As shown in FIGS. 1 and 2, the shovel has a plurality of teeth 1 of which the two outer teeth 2 and 3 are arranged at a higher level than the teeth therebetween. The individual teeth 1, 2, 3 are connected together by means of strengthening spacers 4, and thus supported by one another, in order to ensure that the fork always has the necessary mechanical strength. Two bars 6 and 7 secured to the fork's back 5 connect back 5 to bearing 8 which in turn is connected through lever arm 9 to the digger's actuating rods (not shown in the drawing).

Figure 4:
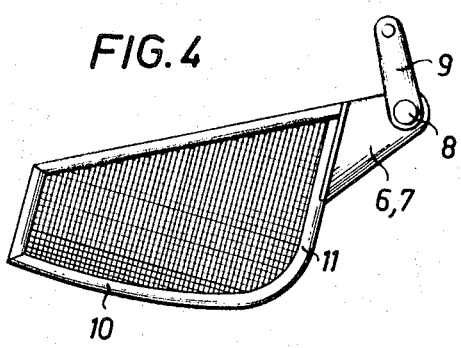
FIG. 4 is a sectional view taken along the line IV—IV of FIG. 3.
Figure 3:
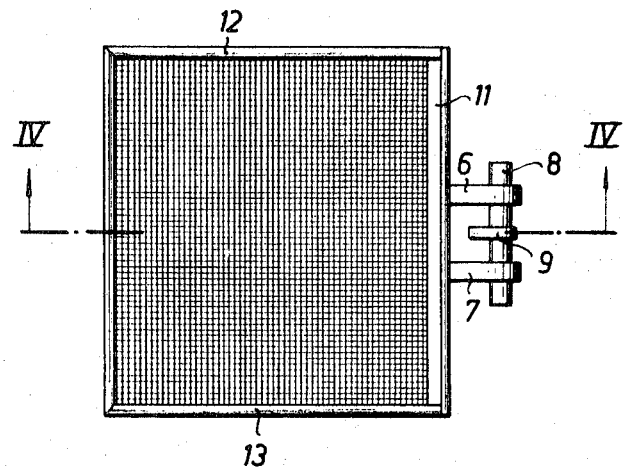
FIG. 3 is a top plan view of an alternative shovel for use with the digger and designed as a screening box.

The screening box shown in FIGS. 3 and 4 is used for the removal of relatively fine ferrophosphorus fragments. Its bottom 10, rear wall 11 and side walls 12 and 13 are made up of perforated sheet iron, expanded metal or wide-meshed wire gauze with meshes 15 and 30 mm across. Bars 6 and 7 are secured to the screening box, and to bearing 8, which is connected to lever arm 9 upon which act the actuating rods of the digger.

The ferrophosphorus is either delivered to a container by means of the digger, or conveyed directly to rail wagons by means of a bucket conveyor. The shovel enables the ferrophosphorus removed from the casting bed to be freed from adhering sand, by shaking it, above the casting bed, by means of the telescopic arm of the digger. The fork shown in FIGS. 1 and 2 is forced below the ferrophosphorus layer to remove the crushed ferrophosphorus from the casting bed.

The screening box shown in FIGS. 3 and 4 of the accompanying drawings, however, is used for the removal of relatively small fragments of slag and ferrophosphorus from the sand bed, necessarily together with a certain quantity of fine sand. The sand is made to drop back into the bed by shaking the screening box by means of the telescopic arm of the digger, which is then used to remove the coarse material from the casting bed. This is done as often as necessary to keep the sand bed free from undesirable granular material. Following this removal of the coarse material, levelling equipment is used to re-prepare the bed in such a manner that only an insignificant amount of manual work is required to obtain a smooth bed.

We claim:

1. A process for separating ferrophosphorus and phosphorus furnace slag from each other in a casting bed receiving a ferrophosphorus/phosphorus furnace slag mixture which is tapped off periodically from a phosphorus furnace, the heavier ferrophosphorus being deposited on the bottom of the said bed below the phosphorus furnace slag which floats thereon, which process comprises pouring the said mixture into the said casting bed so as to obtain an upper layer of slag having a thickness of between about 20 and 40 cm. over a bottom layer of ferrophosphorus having a thickness of between about 10 and 30 cm., allowing the poured layers to remain therein for a period substantially within the range of from about 2 to 2.5 hours and then cooling their surface area by spraying water thereonto; after a period substantially within the range of from about 4 to 5 hours after pouring, mechanically crushing the upper layer of phosphorus furnace slag from above and mechanically removing the crushed slag from the unbroken bottom layer of ferrophosphorus; cooling the remaining unbroken layer of ferrophosphorus by spraying water thereonto; after a period substantially within the range 5 to 6 hours after pouring, mechanically cracking the ferrophosphorus layer from above while maintaining its position in the casting bed, and thereafter removing the crushed ferrophosphorus layer from below.

* * * * *